COIN CONTROL CIRCUIT FOR POSTPAY TELEPHONE PAYSTATIONS

Filed Oct. 7, 1952 2 Sheets-Sheet 1

INVENTOR.
RAY J. GALLAGHER
BY Mc Walter Owen
ATTY.

COIN CONTROL CIRCUIT FOR POSTPAY TELEPHONE PAYSTATIONS

Filed Oct. 7, 1952 2 Sheets-Sheet 2

INVENTOR.
RAY J. GALLAGHER

BY Wm. Walter Owen.

ATTY.

United States Patent Office 2,707,724

Patented May 3, 1955

2,707,724

COIN CONTROL CIRCUIT FOR POSTPAY TELEPHONE PAYSTATIONS

Ray John Gallagher, River Forest, Ill., assignor to Automatic Electric Laboratories, Inc., Chicago, Ill., a corporation of Delaware Application October 7, 1952, Serial No. 313,507

3 Claims. (Cl. 179—6.3)

The present invention relates in general to telephone paystations and more specifically to coin controlled circuits particularly adaptable for use with postpay telephone paystations.

As applied to postpay telephone paystations, the primary object of the invention is to provide a simple, economical and improved coin controlled circuit arranged for use with the coin controlled actuating mechanism of a postpay telephone paystation, wherein satisfactory talking connections are prevented, subsequent to the answering of an initiated call by a called party, until a coin of a specific denomination (a dime or a quarter as disclosed in the present illustration) has been deposited.

Referring to U. S. Patent No. 1,383,472, issued July 5, 1921, to G. A. Long, it will be noted that this patent may be taken as one disclosure of a standard automatic paystation telephone, requiring the deposit of a coin of a certain denomination (such as five cents or a nickel) as the usual established fee charged for all local paystation calls. However, because of changed present day economic conditions resulting in rising costs, many telephone companies have been forced to increase the charge for such local calls to ten cents. Therefore, in view of the rising costs it has become necessary to use a ten cent coin, or the equivalent, to perform the same functions previously accomplished by the five cent coin. However, the five cent coin channel in the coin chute of the paystation can not be permanently blocked because in toll calls, other than local calls, the assessed charges may be such as to require the deposit of a five cent coin in addition to ten cent coins and twenty-five cent coins to meet the required charge.

Referring to my co-pending application filed June 21, 1950, Serial No. 169,479, it will be noted that an automatic telephone paystation, such as disclosed in the above noted patent to G. A. Long, has been modified to include mechanical apparatus in the coin chute for controlling the acceptance of certain denominations of coins for local calls and the acceptance of certain denominations of coins for toll calls. It will also be noted that the circuit diagram, disclosed as being one of the preferred forms of use in my above-mentioned co-pending application, is arranged such that the illustrated telephone paystation may be controlled and operated as a paystation commonly known as the prepay type, in which when a local call is initiated, the required fee for the local call is deposited prior to the dialling operation.

In accordance with a main feature of the present invention, means is provided in my improved circuit for utilizing the mechanical apparatus of the type such as shown in my previously mentioned co-pending application to control said apparatus, whereby the telephone paystation may be controlled and operated as a paystation commonly known as a postpay paystation, in which when a local call is initiated, the required fee for the local call is deposited subsequent to the called party answering, but prior to normal conversation taking place.

Another feature of the invention relates to the provision of improved circuit means in conjunction with the mechanical apparatus of my previously mentioned co-pending application, whereby the numerous existing postpay paystations now in use can be modified with a minimum change in the existing equipment to comply with the newly increased charges so that the expense in modifying these existing paystations can be kept at a minimum and new paystations can be manufactured without a substantial increase in cost.

Referring more in detail to my aforementioned application and bearing in mind that the disclosed paystation is of the prepay type, wherein a mechanical apparatus, or adaption, is included in the paystation coin chute for rejecting an initially deposited nickel, thereby compelling the calling party to deposit ten cents or twenty-five cents to effect the connection. Once the call is initiated the nickel coin channel is conditioned for a subsequent acceptance of nickels in payment of toll charges. The present invention utilizes this mechanical adaption and concerns itself with the means for controlling the conditioning means for the five cent channel. In the above cited co-pending application a portion of the wall of the five cent channel is removed and replaced by a small rectangular thin sheet of nickel silver (controlling spring) projecting diagonally into the channel and anchored at one end to the coin chute. The other end is flexed to an other than normal position by the armature of a control relay. This controlling spring is normally positioned in the nickel coin channel so that a deposited nickel will be diverted to fall out of the channel into the refund chamber in the same manner as would a non-standard coin. Thus the calling party would have to deposit a dime or quarter to actuate the coin trigger contacts for completing satisfactory talking connections. The control relay is connected in the paystation circuit in series with the line so that it will operate as soon as the call is initiated and a finder has found the line. The controlling spring will be flexed or pivoted out of the channel responsive to the operation of this control relay; and therefore any subsequent nickels deposited for toll charges or additional charges will pass through the entire nickel channel to strike the coin signal bell. The control spring forms a portion of the retaining wall in the nickel channel when the spring is in a flexed position.

As applied in the present invention, the control relay similar to the one such as described in my co-pending application is connected in the paystation line circuit in series between one of the induction coil windings and the transmitter. A local call may be initiated responsive to the removal of the receiver and the dialling of the desired call number. When the called party answers, reversal of battery operates a polarized magnet at the calling paystation. This operated polarized magnet controls a first set of contact springs which shunt the release magnet, and a second set of contact springs which shunt the control relay, the transmitters, receiver and one of the induction coil windings. Thus the calling party can hear, but cannot use the transmitter or receiver as a transmitter. The shunt on the control relay releases this relay, which in turn allows the coin control spring to assume its normal blocking position in the nickel channel, thereby forcing deposited nickels out of the coin chute and cause them to be refunded. Therefore, to remove the shunting circuits for the control relay, transmitters, induction coil and receiver, a suitable coin such as only a dime or quarter can be deposited. A deposited dime or quarter in striking the coin trigger will open the second set of contact springs, thus opening the previously mentioned shunting circuits in order for normal conversation to take place. The third set of contact springs are closed by the actuated coin trigger for placing a shunt around the polarized magnet, thereby causing it to release. At the end of conversation the receiver restores the hookswitch to normal which opens the shunting circuit applied to the release magnet by means of the first set of contact springs. The release magnet operates in series with the line and restores all of the sets of contact spring assemblies to normal.

When a toll call is made, or an operator is called, reverse battery is not returned to the calling party. The polarized magent does not operate and the control relay is operated all the time. Thus the nickel channel is conditioned to accept nickel deposits, in addition to dime or quarter deposits, during the connection. Once coins are deposited during the above-noted connection, they can not be refunded since they are automatically collected.

It will be noted that during dialling, the dial shunt springs place a momentary shunt around the control relay so that this relay releases before and reoperates after each digit is dialled.

It will be appreciated that the Figs. 2 and 3 which are similar to Figs. 2 and 3 of the drawings in my previously mentioned co-pending application are also disclosed in the instant application in order to more clearly bring out a preferred form of one practical application of the invention.

Additional other features and advantages of this invention will become apparent upon a further perusal of the specification and claims, taken in conjunction with the accompanying drawings comprising Figs. 1–4, which show by means of the usual diagrams a sufficient amount of the apparatus to enable the invention to be described and understood and in which:

Fig. 1 is a schematic representation of the circuit of a postpay telephone paystation including the invention.

Fig. 1–A shows the means included in the connector for applying reverse battery to the paystation line.

Like reference numbers have been used throughout the drawings to indicate the same or similar elements.

Figure 1:
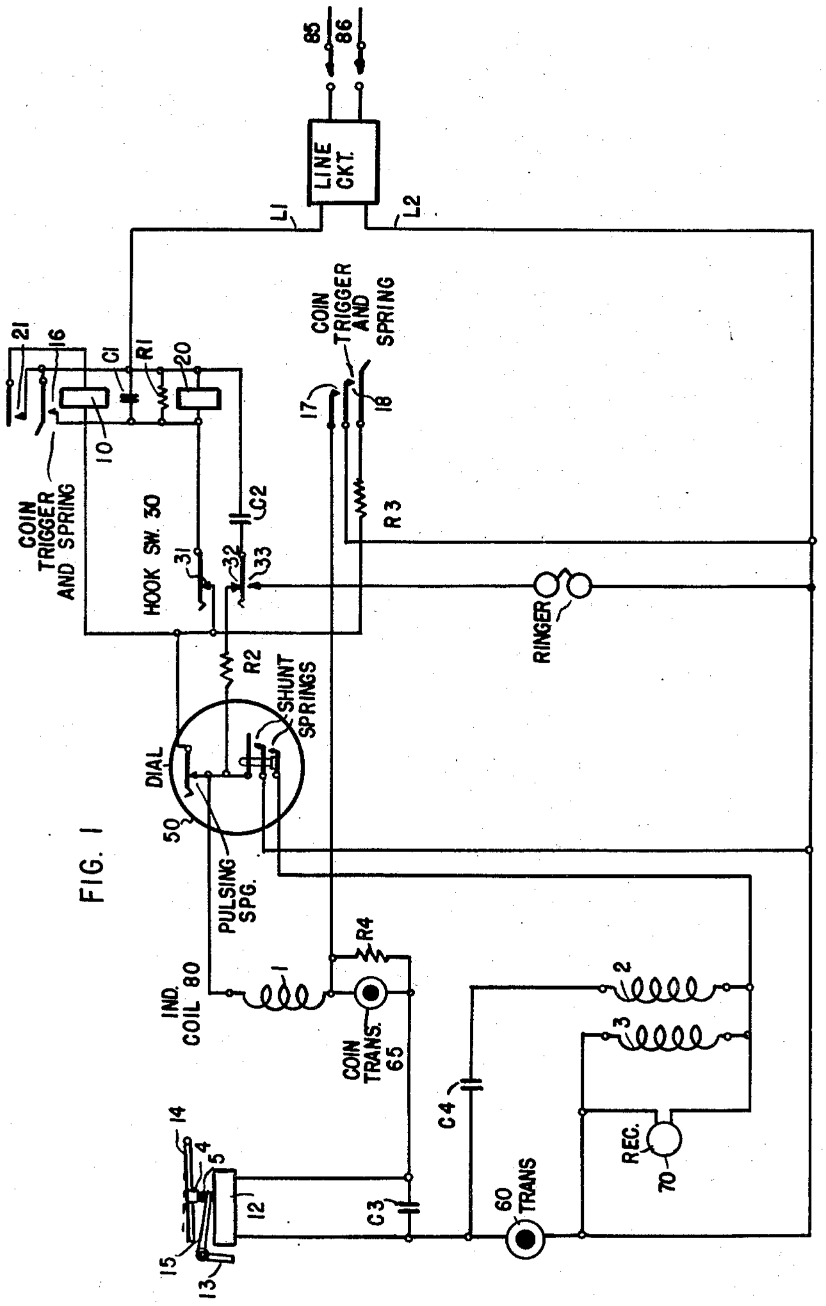
Figure 1A:
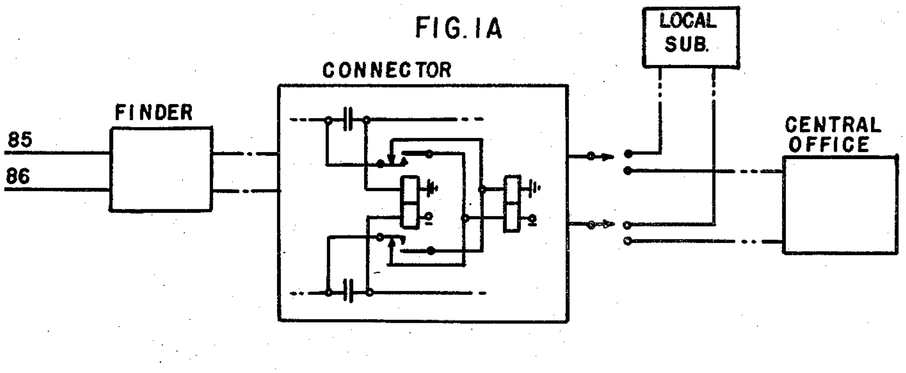
Figure 2:
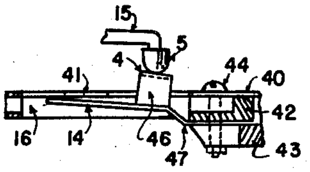
Fig. 2 is a sectional view of the nickel channel in a coin chute showing the coin control spring in its normal blocking position.
Figure 3:
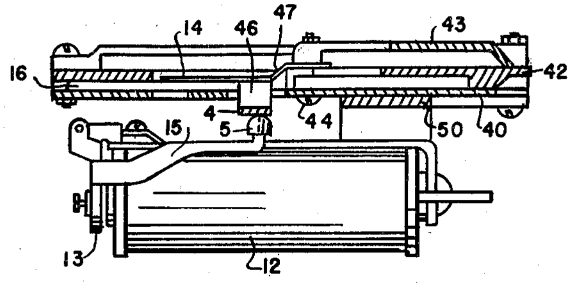
Fig. 3 is a sectional view of the coin chute showing the control relay in its operated position and the coin control spring in its unblocking, or flexed, position.

Referring to the drawings, and in particular to Fig. 1, a detailed operational description will now be given. Assuming that a calling party at a postpay telephone paystation, which includes the circuit such as disclosed in Fig. 1, wishes to make a local call; the desired call number is dialled, subsequent to the removal of the handset from the hookswitch 30, without depositing a coin. At the instant that the handset is removed, hookswitch 30 closes contacts 31, hereby completing an obvious circuit which, in the usual manner, causes a finder switch to seize the calling line and thereafter to complete a loop circuit to the line relay of the associated finder by way of line conductors L1 and L2. Since control relay 12 is included in series in this loop circuit, it operates at this time. At the time that the call number is dialled, it will be noted that each time dial 50 is rotated off-normal at the beginning of dialling, the dial shunt springs complete an obvious shunting circuit for control relay 12 so that it will release before and reoperate after each dialled digit.

Figure 4:
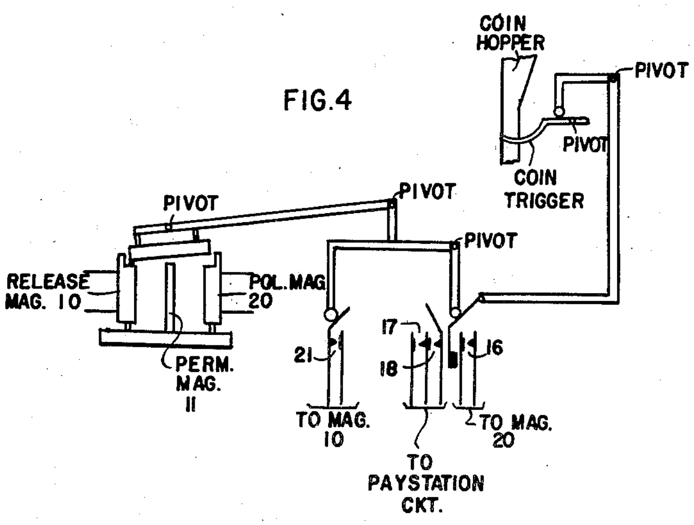
Fig. 4 is a schematic representation showing the normal position of the linkages from the coin trigger and the common armature of the polarized magnet and release magnet and the groups of contacts controlled thereby.

Before continuing further with the present description, it is thought best to give a more complete description of Fig. 4. Magnet 20 is constructed as to be polarized by permanent magnet 11 and will thus operate in the well-known manner of a polarized magnet. Magnet 10 is also polarized by a same permanent magnet 11 and will also operate as such. However, magnets 10 and 20 operate responsive to different polarities of current received at different instances from the line. Hereafter magnet 10 will be referred to as release magnet 10 and magnet 20 will hereafter be referred to as polarized magnet 20. As shown, the magnets, coin trigger, contact groups and linkages are all at normal. When battery is reversed responsive to answering by a called party, polarized magnet 20 operates and attracts the armature towards its core. The linkage associated with the armature is also rotated about its pivot and moved downward, whereby the left-hand follower obviously closes contact 21 in the later-described shunting circuit of release magnet 10. The right-hand follower rides against the spring associated with the coin trigger linkage and slides downward while also moving clockwise and in so doing, closes contacts 17 and 18 for the later-described shunting circuits of the transmitters, receiver and control relay. When a coin is deposited the coin trigger is rotated downward and the linkage associated with the coin trigger moves counter-clockwise, thus moving the spring, which bears against the right-hand follower, in a direction to the right. The right-hand follower thus no longer bears against the spring which controls contacts 17 and 18 and they are thereby opened. The same spring associated with the coin trigger linkage simultaneously closes contact 16 for the later-described shunting circuit of polarized magnet 20. At the end of conversation and when the called party hangs up, battery is again reversed to its normal polarity, and after the calling party hangs up, release magnet 10 operates and at this time restores the armature linkage and the coin trigger and its linkage to normal as shown.

The dialling operation, effects the connector in the usual manner to complete the connection with the desired local party in a well-known manner. The called party is signalled in the usual manner and, responsive to the answering of the call by the called party, reverse battery is transmitted back to the calling paystation in a manner well-known to the art. The reversal of battery from the called party immediately causes polarized magnet 20 to operate over a circuit from the connector, finder, the closed loop and back to the finder and connector. In operating, magnet 20 closes contacts 17 and 18 which place the resistance R3 in obvious shunt of winding 1 of induction coil 80. At contacts 17 and 18 an obvious shunt is also placed across transmitter 60, receiver 70, control relay 12, and coin transmitter 65. At contacts 21, magnet 20 places release magnet 10 in parallel with itself, however release magnet 10 is of a very high resistance and does not operate at this time.

The shunting of the winding 1 of induction coil 80 reduces the receiving efficiency of receiver 70 considerably and the other shunt placed across transmitter 60, receiver 70, control relay 12, and coin transmitter 65 prevents normal use of transmitter 60 and the use of receiver 70 as a voice transmitter at this time.

Control relay 12 releases responsive to the above-mentioned shunt and positions the coin controlling spring 14 of the aforementioned mechanical apparatus across the nickel channel of the coin chute. Due to the receiver being shunted, the calling party is enabled to only faintly hear the called party and conversation is prevented until a coin of the proper denomination is deposited. In order to remove the shunts placed in effect by the operation of contacts 17 and 18, the deposit of either a dime or quarter is required, as they are the only suitable coins available, because a deposited nickel at this time will be forced out of the nickel channel by means of the coin controlling spring 14 and thereby refunded.

Assuming in this case that a dime is deposited, the coin upon striking the coin trigger will restore contacts 17 and 18 to normal. It will be noted at this time, that the coin trigger, which is actuated by all deposited coins traveling the full length of their respective channels, has access to contacts 16, 17 and 18 for controlling the operations thereof. The restoring of contacts 17 and 18 to normal thus removes the previously mentioned shunts, thereby allowing conversation to take place between the calling and called party. The coin trigger actuated by the deposited dime also closes contacts 16, which complete an obvious shunt of the polarized magnet 20. Polarized magnet 20 thus restores.

Assuming for instance that a nickel is the first, or only, coin deposited: The nickel will travel down the nickel channel until it strikes the coin controlling spring 14 (which is projecting into the nickel channel, since control relay 12 is not operated) and be diverted out of the channel and fall into the refund chamber and thus not strike the coin trigger for the above-described necessary operations.

At the end of conversation, and responsive to the receiver being placed on hookswitch 30, the previously mentioned loop circuit is opened at contacts 31. When the called party restores his handset, the reversed battery is removed from the line. The opening of contacts 31 of hookswitch 30 also opens the previously mentioned parallel connection of release magnet 10 and polarized magnet 20, thereby placing magnet 10 in series with the line. Release magnet 10 operates at this time from the normal battery potential in the finder and restores all the contact spring assemblies and the coin trigger spring to normal.

Assuming in a different case that the calling paystation desires to call a central office operator in order to make a toll call, the same operations take place in the previously described well-known manner up to and including the point at which time the operator answers the call. At this time the answering of the call by the operator does not reverse battery, therefore the polarized magnet 20 does not operate and control relay 12 remains operated all the time. In view of control relay 12 being operated, controlling spring 14 is moved out of the nickel channel and is thus conditioned to accept nickels during the connection with the operator as part of the required payment of the assessed toll fee.

It will be appreciated that if a nickel is deposited during any time that control relay 12 is operated, the coin can not be refunded since these coins are automatically collected once they have traveled the full length of the nickel channel. It will also be appreciated that dimes and quarters will be collected all the time since no means is provided for their refund or blocking their passage through their respective channels. Considerable saving in material and labor is thus affected, because refunding equipment is considered unnecessary in a postpay paystation.

Having described my invention, what is considered new and desired to have protected by Letters Patent will be pointed out in the appended claims.

What is claimed is:

1. In a telephone system, a postpay telephone paystation having the usual instrumentalities comprising a dial, a receiver and a transmitter included therewith, a coin directing apparatus also included in said paystation for accepting deposited coins of a certain denomination in one case and rejecting deposited coins of said certain denomination in another case, a control magnet for positioning said coin directing apparatus, means for extending a call from said paystation to a desired called party, a circuit for said paystation, means for connecting said circuit with said last mentioned means responsive to the initiation of a call by said paystation, said control magnet, said receiver, said transmitter and the pulsing contacts of said dial all being serially included in said circuit, said control magnet being operated responsive to said call initiation for positioning said coin directing apparatus to a coin accept position, said coin directing apparatus allowing deposited coins of said certain denomination to be accepted in said one case when said initiated call is extended to a toll operator, means for applying reverse battery to said circuit in said other case when said initiated call is extended to a local subscriber and said call is answered by said local subscriber, a polarized magnet serially included in said paystation circuit and operated responsive to receipt of said reverse battery, a shunting circuit for shunting said control magnet, said receiver, said transmitter and said dial pulsing contacts, and coin contact means operated by said polarized magnet for completing said shunting circuit, said control magnet being restored responsive to the completion of said shunt circuit for positioning said coin directing apparatus to a reject position, whereby deposited coins of said certain denomination are thereafter rejected.

2. A telephone system such as claimed in claim 1, wherein said coin contact means is reoperated by a deposited coin of a different denomination for opening said shunting circuit to free said transmitter and receiver for use in conversing with said called local subscriber and said control magnet is reoperated for positioning said coin directing apparatus to said coin accept position for accepting deposited coins of said certain denomination, and including other coin contact means operated by said deposited different denominational coin for excluding said polarized magnet from said paystation circuit.

3. A telephone system such as claimed in claim 2, including a release magnet, and contacts operated by said polarized magnet for including said release magnet in a circuit parallel with itself, said first mentioned means reoperated by said calling paystation for opening said parallel circuit when said call is completed to serially include said release magnet in said paystation circuit connection, said release magnet operated responsive to said serial inclusion in said circuit for restoring said first mentioned coin contact means, said other coin contact means and said contacts to normal.

References Cited in the file of this patent

UNITED STATES PATENTS

| | | |
|---|---|---|
| 661,130 | Pape | Nov. 6, 1900 |
| 1,790,055 | Mills | Jan. 27, 1931 |
| 1,868,378 | Blomberg | July 19, 1932 |
| 1,963,402 | Comer | June 19, 1934 |
| 2,066,392 | Collins | Jan. 5, 1937 |
| 2,137,409 | Martin | Nov. 22, 1938 |
| 2,367,769 | Goddard | Jan. 23, 1945 |
| 2,642,496 | Dewar | June 16, 1953 |

OTHER REFERENCES

"Paystations for Ten-Cent Service," Stainhauer, The Automatic Electric Technical Journal, April 1952, pages 37–46.